Patented Nov. 27, 1923.

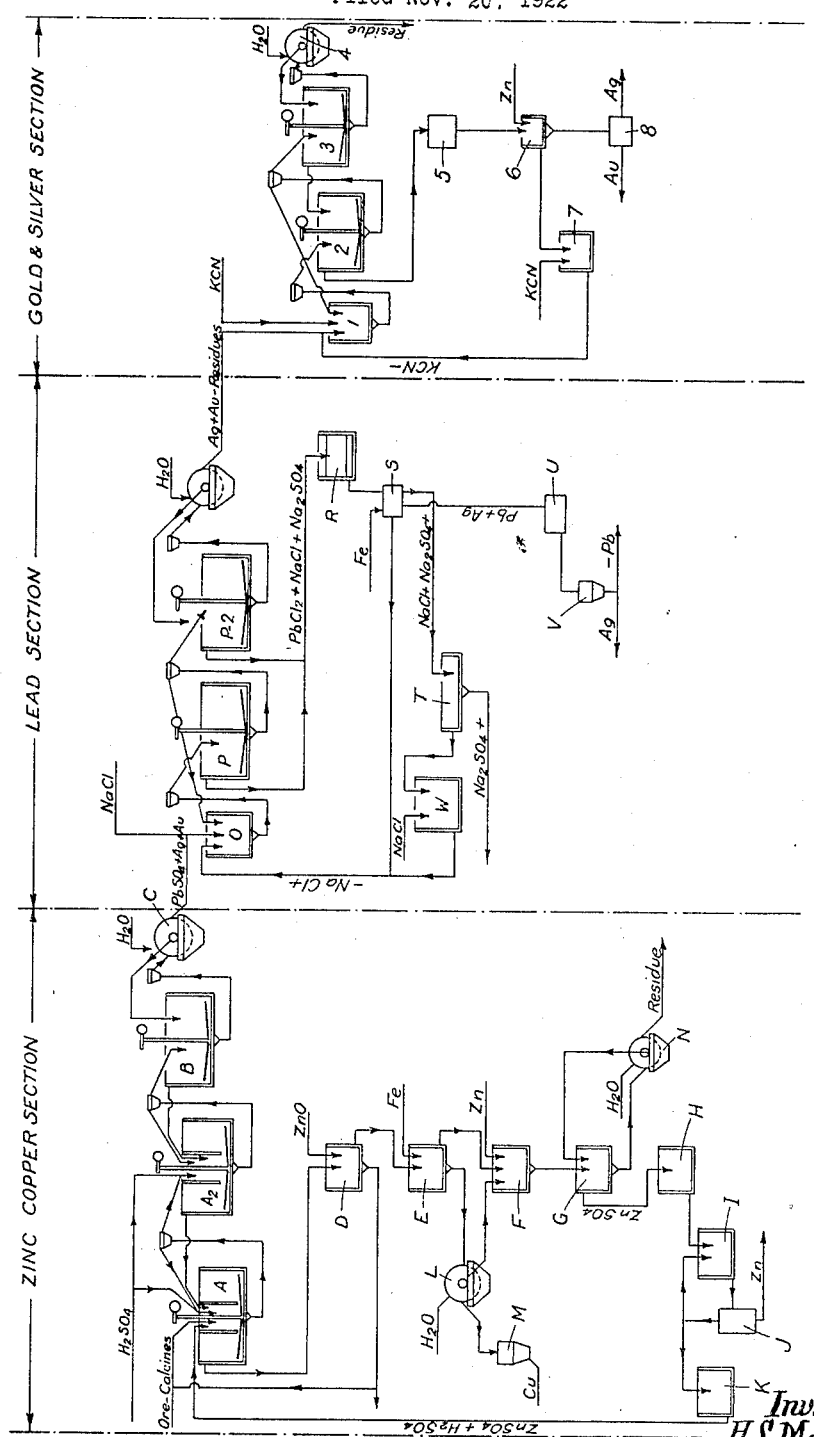

1,475,843

UNITED STATES PATENT OFFICE.

HENRY SQUAREBRIGS MACKAY, OF LONDON, ENGLAND.

PROCESS FOR TREATING ORES.

Application filed November 20, 1922. Serial No. 602,157.

*To all whom it may concern:*

Be it known that I, HENRY SQUAREBRIGS MACKAY, mining and metallurgical engineer, a subject of the King of Great Britain, residing at 4 Broad Street Place, in the city of London, England, have invented certain new and useful Improvements in Processes for Treating Ores, of which the following is a specification.

This invention relates to a process for recovering separately and in successive stages the respective metals contained in complex ores such as sulphide ores containing zinc, copper, lead, silver and gold; while an important part of this process is applicable to the treatment of lead or lead and silver ores for the recovery of said metal or metals from said ores.

My present invention provides (*a*) a process for extracting lead from ore or residues of ore containing sulphates of lead which consists in leaching the ore with a chloride solution to extract the metals from the ore in solution and continuously precipitate the lead from the solution on iron in such a manner that the solution cannot become saturated with lead from the ore to such an extent that it will lose its efficiency as a solvent and (*b*) a process for extracting lead and silver from sulphide ores or a mixture of sulphide and oxidized ores which consists in roasting the ore to convert the lead and silver sulphides of the ore to lead and silver sulphates, leaching the roasted ore with a solution of sodium chloride to form chloride of lead and silver in the solution, adding metallic iron to the solution to precipitate the lead and silver from the solution and form a chloride of iron in the solution which can be used with or without sodium chloride as a solvent for the lead and silver sulphates in the ore.

Briefly stated, the present invention for the treatment of sulphide ores containing copper, zinc, lead, silver and gold is a chemical and electro-chemical process as follows:—

The ore is crushed in any suitable manner to about 60 mesh or other suitable mesh and roasted to convert the metal sulphides of the ore into a soluble form. The copper and zinc are made soluble in a weak solution of sulphuric acid and the lead and silver soluble in a solution of sodium chloride or ferrous chloride and the gold soluble in a solution of potassium cyanide.

The above and various other objects and advantages of this invention will be brought out in the following specification of the preferred manner of practicing the same, reference being made to the accompanying drawing which shows a flow sheet or a diagrammatic view of a plant suitable for practicing the process of this invention.

The ore is suitably crushed say to about 60 mesh, and is then roasted, for example in furnaces of MacDougal type or similar furnaces. The roasted calcines are next delivered into the central chamber of a lead lined Dorr thickener agitator A in which agitation with air takes place.

This standard Dorr thickener agitator A is constructed so that the agitation takes place in the central portion, and settling of the residues takes place in the outer portion. The residues settled are drawn out at the bottom and pumped to the top of the same agitator or to another agitator thickener A² following in the series as desired.

From the top of this last-named agitator thickener A² the clear solution flows to the agitator A, and the residues are drawn from the bottom of A² to a third thickener B. The clear solution is drawn from the top of thickener B to a filter press C, such as of the Oliver type. The residues from filter C go to the lead section of the plant, and the clear solution goes back to the thickener B and back from B to A² and A.

A cold weak solution of sulphuric acid, from an acid storage tank or other suitable source, is added to agitators A and A² as desired in sufficient quantity to dissolve all the soluble copper and zinc in the calcines, and deliver a neutral solution from the top of the thickener section of A to another agitator D.

In agitating the calcines in the sulphuric acid solution with air in agitators A and A² the iron is oxidized and ferric sulphate is formed; $Fe_2(SO_4)_3$ as is also aluminium sulphate; $Al_2(SO_4)_3$.

This neutral solution is passed into agitator D and zinc oxide is added and agitated with air.

The object of this is to form more zinc sulphate; $ZnSO_4$, so that when it is electrolyzed the acid that was combined as $Fe_2(SO_4)_3$ and $Al_2(SO_4)_3$ will be recovered, and also to precipitate part of the other impurities from the solution; such as bismuth, arsenic and antimony. The reaction which takes place in a solution containing $Fe_2(SO_4)_3+Al_2(SO_4)_3+H_2O$ when agitated in presence of zinc oxide is as follows:—

$$Fe_2(SO_4)_3+Al_2(SO_4)_3+6H_2O)+6Zn =$$
$$6ZnSO_4+2Fe(OH)_3+2Al(OH)_3$$

The iron and aluminium are precipitated as hydroxides.

The precipitates from agitator D, if they carry zinc oxide of commercial value, are returned to agitator A and the zinc is recovered with the acid solution. If they do not carry sufficient value they are filter pressed and discarded the clear solution going into still another agitator E.

The clear solutions from agitator D are delivered into agitator E where iron dust is added to precipitate the principal part of the copper, antimony, bismuth and arsenic.

The clear solution is delivered from agitator E to another agitator F, and the residues containing the copper are drawn from the bottom of agitator E and delivered to another filter press L, of the Oliver or other suitable type, where they are filter pressed. The filter press cakes go to a smelter M, or they may go back to a roasting furnace and be oxidized and dissolved in sulphuric acid and precipitated by electrolysis.

Copper if present in sufficient quantity is precipitated by electrolysis to a point where the solutions carry about 0.75% copper in the presence of zinc sulphate, the balance of copper is precipitated on iron or zinc dust.

The copper precipitated can be either smelted or oxidized by roasting and re-dissolved in sulphuric acid and precipitated by electrolysis.

The extraction of the zinc and copper may be effected substantially in the manner described in my United States patent specification dated 21st April, 1914, No. 1,094,371.

The residues carrying the lead are first agitated in hot sodium chloride solutions in Dorr agitators and thickeners or other similar apparatus. Before the solutions become saturated with lead chloride the clear lead chloride solutions are continuously drawn off from the Dorr thickeners, and the lead precipitated viz the lead may be precipitated on iron (or any metal higher in the electrochemical series than lead) preferably in the form of metal dust—and the solutions regenerated and returned to the agitators.

This is a very important step in the process. Unless the lead is continuously precipitated from the solution, the saturation point is soon reached, and the solvent action ceases. But in this process it is so arranged that the lead is continuously precipitated so that the saturation point is never reached. The solvent is continuously regenerated and never loses its efficiency.

The clear solution from the filter press L goes to the agitator F. Zinc dust is added to the solution in agitator F to precipitate the last traces of cadmium, iron, cobalt, nickel, antimony, bismuth, copper and arsenic.

From the bottom of agitator F the residues and solution are drawn into a Dorr thickener G, and the clear solution drawn from the top of this thickener G to a sand filter H, and the precipitates from the bottom of the thickener G are passed to another filter press N, of the Oliver or other suitable type. The filter cake is discarded and the clear solution from the filter press N is returned to the thickener G.

The sand filter H frees the solution of all sediment and the purified solution passes into a storage tank I, from storage tank I the solution passes through the electrolytic cells J where the zinc is precipitated and sulphuric acid regenerated; part of the solution leaving the electrolytic cells J passes back into the storage tank I to standardize the electrolyte, and part of it passes into another storage tank K, from which the solution may pass back to agitator A to leach fresh ores.

Now as to the lead section of the plant, the lead residues from the aforesaid Oliver filter C pass into a Dorr agitator O where they are agitated in a chloride solution. The solution and pulp are drawn from the bottom of this agitator O and pumped to the centre of thickener P.

After the lead residues are leached with sodium chloride in starting the process, and after the lead is precipitated, an iron ferrous chloride is formed in the solution, and the leaching solutions then continue in the process containing sodium chloride and ferrous chloride. Ferrous chloride may be used as the leaching solution without sodium chloride, but for economic reasons sodium chloride should be used with ferrous chloride.

When the ore is roasted so that the lead is combined as $PbSO_4$ the reactions which take place are as follows:—

*1st reaction.*

$$PbSO_4+2NaCl=PbCl_2+Na_2SO_4$$

*2nd reaction.*

$$PbCl_2+Na_2SO_4+Fe = Pb+FeCl_2+Na_2SO_4$$

Thus by precipitating lead from its chloride with metallic iron an active solvent for lead sulphate is formed as ferrous chloride.

After the lead is precipitated on iron, such as when the leaching solution contains sodium chloride, the formula will be as follows:—

$$FeCl_2+2NaCl+Na_2SO_4$$

When this solution is used to leach the ore, both the ferrous chloride and sodium chloride are available to form chloride of lead as follows:—

*1st reaction.*

$$PbSO_4 + 2NaCl + FeCl_2 + Na_2SO_4 = PbCl_2 + 2Na_2SO_4 + FeCl_2$$

or

*2nd reaction.*

$$PbSO_4 + FeCl_2 + 2NaCl + Na_2SO_4 = PbCl_2 + FeSO_4 + Na_2SO_4 + 2NaCl$$

After the solutions are continuously used in leaching the ore, and ferrous chloride increases in the solution to a point where it becomes a sufficiently active solvent for lead sulphate, then sodium chloride can be discontinued in the solution.

The chemical reactions which take place in the solution without sodium chloride would be as follows:—

$$PbSO_4 + FeCl_2 = PbCl_2 + FeSO_4$$
$$PbCl_2 + FeSO_4 + Fe = Pb + FeCl_2 + FeSO_4$$

By this reaction ferrous chloride is regenerated and metallic lead precipitated.

When this solution is continuously used in leaching ore containing lead sulphate, ferrous sulphate increases in the solution. When the ferrous sulphate reaches saturation point in the solution it can be crystallized out and saved as a by-product, or part of the solution may be discarded to prevent the ferrous sulphate from decreasing the efficiency of the solvent. The chlorine lost by discarding a part of the ferrous chloride solution can be made up by adding sodium chloride to the solution.

The pulp is drawn from the bottom of the thickener P and pumped to an agitator O. The clear solution is drawn from the top of this thickener P and flows to a sand filter R, and from the bottom of the sand filter R to a precipitating drum S where the lead and silver are precipitated on iron.

The solution from the bottom of the precipitating drum S flows to a crystallizing tank T where it is cooled and where sodium, sulphate or ferrous sulphate is crystallized out or returned direct to agitator O.

The solution is then drawn into a storage tank W wherein it is standardized by adding sodium chloride, if required, and is then pumped back to agitator O to be used in the circuit to leach the lead sulphate residues.

When all the soluble lead is extracted from the residues, they are pumped to the thickeners P and P² and thence to a filter press Q and washed, the clear solution going back to the thickener P² and the filter cake going to the gold and silver recovery plant.

The clear solution from thickeners P and P² goes to the sand filter R, precipitating drum S, crystallizing tank T storage tank W, and back to the agitator O, or directly back to the agitator O. The lead precipitates from drum S are drawn off and washed in a revolving drum and thence go to the melting pot to be melted and refined by the ordinary well-known methods.

The washed filter cake, discharged from the filter press Q of the lead section, is delivered into an agitator 1 and agitated with air in a solution of potassium cyanide.

The pulp from this agitator 1 is drawn off from the bottom of this agitator and delivered to the centre of the Dorr thickener 2; and from the bottom of this thickener 2 back to agitator 1. The pulp passes in this circuit until the soluble gold and silver are in solution. Then the pulp is passed into another thickener 3, where it is settled, and drawn from the bottom of this thickener 3 to an Oliver, or other suitable, filter press 4, where it is filter pressed and washed and the filter cake discharged.

The clear solutions pass from the filter press 4 to thickener 3, and from the top of this thickener 3 to the centre of the thickener 2, and from the top of the latter to the clarifying filter 5, and from this last-named filter 5 to the precipitating boxes 6.

Zinc dust is added in the precipitating boxes 6 and the gold and silver are precipitated from solution.

The clear solution from the precipitating boxes 6 is delivered into the storage tank 7 where the solution is standardized with potassium cyanide and returned to agitator 1.

The gold and silver precipitates are delivered from the precipitating boxes 6 to the refining department 8 where the gold and silver are separated and refined by the ordinary well-known methods.

The second part of this process may be employed for treating ores which carry silver in which case the ore is roasted in such a manner that practically all the lead and a large percentage of the silver is converted into the sulphates of these metals, $PbSO_4 Ag_2SO_4$. The silver so formed is recovered in solution as a chloride of silver, $2AgCl$, and precipitated with the lead when metallic iron is added to the solution as follows—using sodium chloride solution:—

$$PbSO_4 + Ag_2SO_4 + 4NaCl = 2AgCl + PbCl_2 + 2Na_2SO_4$$

$$PbCl_2 + 2AgCl + 2Na_2SO_4 + 2Fe = Pb + 2Ag2FeCl_2 + 2Na_2SO_4$$

using ferrous chloride solution the reactions are as follows:—

$$PbSO_4 + Ag_2SO_4 + 2FeCl_2 = PbCl_2 + 2AgCl + 2FeSO_4$$

$$PbCl_2 + 2AgCl + 2FeSO_4 + 2Fe = Pb + 2Ag + 2FeCl_2 + 2FeSO_4$$

After the lead and silver are precipitated, part of the solution is purified, as required, by crystallizing out the sodium sulphate or ferrous sulphate in accordance with the chloride solution used and the other part goes directly and continuously back to the leaching agitators. The part that is purified is then standardized with sodium chloride, if required, and returned to the leaching agitators.

The lead precipitates are washed and melted; the silver extracted as a chloride is also precipitated with the lead and separated from the lead in refining by the ordinary method.

After the lead and part of the silver is recovered from the ore as aforesaid, the residues are filter pressed and washed, the solution going to the lead precipitating section of the plant and the residues to the Dorr agitators and thickeners of the gold and silver section of the plant where the remaining residues are leached with cyanide potassium to recover the remaining gold and silver and precipitated on zinc dust in the usual manner adopted in the cyanide process.

In arranging the plant for this process the Dorr agitators of the lead leaching section of the plant can be enclosed in brickwork if desired leaving a space between the brickwork and the outside of the steel lead-lined agitators through which the hot gases from the roasting furnaces circulate to heat the sodium chloride leaching solutions.

The first section of the process where the zinc and copper is extracted is or may be the same as my aforesaid known process for the extraction of copper and other metals.

The third section of the above process for the extraction of gold and silver is or may be the same as the well-known cyanide process.

The second section of the above process viz for the extraction of the lead and silver is new and is what heretofore has been the missing link in a successful hydrolmetallurgical process for the separate extraction of the various metals from complex ores; and this second section may be used separately for treating lead or lead and silver ores for the recovery of these metals from their ores.

This missing link connecting the well-known processes makes a new process and by the use of this combination process any complex zinc, lead, copper, gold and silver ores can be successfully treated at much less cost than by any other process and moreover this process avoids all smelting of complex ore whether sulphides or otherwise.

This process makes valuable deposits of complex ore which heretofore have been of no value.

What is claimed is:—

1. In a continuous process for extracting lead from ore which consists in first converting the lead to lead sulphate next leaching the resulting ore with a chloride solution to extract the lead in solution from the ore, continuously precipitating the lead from the solution on a metal such as iron in such a manner that the solution cannot become saturated with the lead from the ore to such an extent that it will lose its efficiency as a solvent, and continuously employing the resulting solution to leach more ore containing lead sulphate.

2. In a continuous process for extracting lead from ore which consists in first converting the lead to lead sulphate, next leaching the resulting ore with a chloride solution to extract the lead in solution from the ore, continuously precipitating the lead from the solution so that the solution cannot become saturated with the lead from the ore to such an extent that it will lose its efficiency as a solvent, and continuously employing the resulting solution to leach more ore containing lead sulphate.

3. In a continuous process for extracting lead and other metals from ores which consists in roasting the ore to convert the sulphides to sulphates of the lead, leaching the roasted ore with sulphuric acid to form sulphates of the metal in solution, continuously precipitating the metal from the solution to recover refined metals and regenerating sulphuric acid to be used in the process and adding a chloride solution to the residues upon removal of the metals to form chlorides of the lead and silver in solution, adding iron to the solution to precipitate the lead and silver continuously from the solution in such a manner that the solution cannot be saturated with lead or silver to such an extent as that it will lose its efficiency as a solvent and continuously employing the resulting solution to leach more ore containing lead sulphate.

HENRY SQUAREBRIGS MACKAY.